April 17, 1956     A. J. GRANBERG     2,742,049
AIR SEPARATOR AND SIPHON BREAKER
Filed May 1, 1952     2 Sheets-Sheet 1
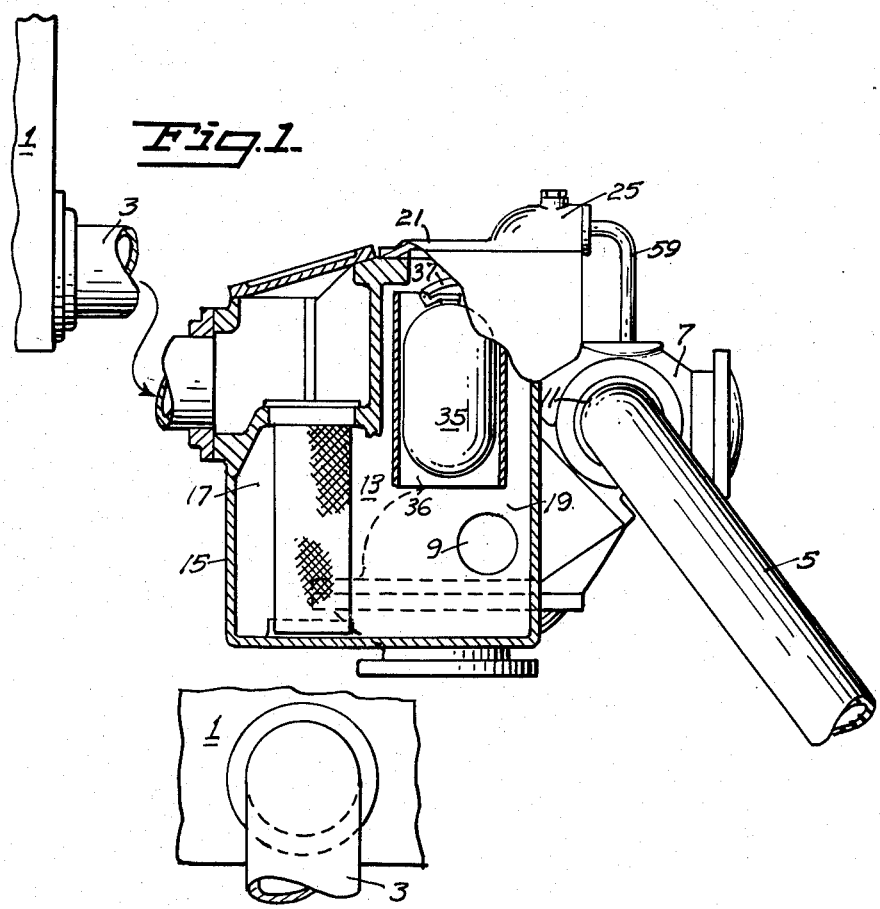
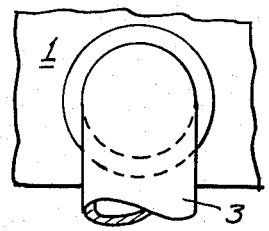
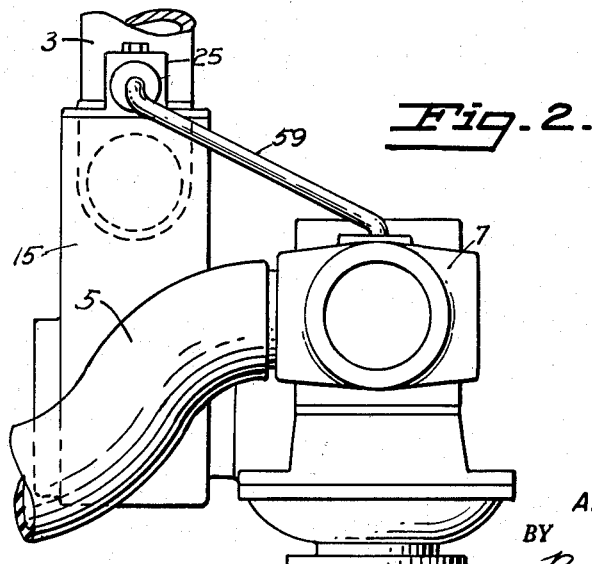
INVENTOR.
ALBERT J. GRANBERG
BY
HIS ATTORNEYS April 17, 1956 A. J. GRANBERG 2,742,049
AIR SEPARATOR AND SIPHON BREAKER
Filed May 1, 1952 2 Sheets-Sheet 2

INVENTOR.
ALBERT J. GRANBERG
BY
Bruce & Brosler
ATTORNEYS

United States Patent Office 2,742,049
Patented Apr. 17, 1956

2,742,049

AIR SEPARATOR AND SIPHON BREAKER

Albert J. Granberg, Oakland, Calif.

Application May 1, 1952, Serial No. 285,577

5 Claims. (Cl. 137—202)

My invention relates to installations for the dispensing of liquids such as gasoline or the like, and more particularly to metering means for accurately measuring such liquid while being dispensed.

In the dispensing of gasoline or the like, the gasoline is sometimes discharged by gravity from an elevated tank, and in the discharge line, is a meter, customarily preceded by an air separator, to remove the air from the gasoline prior to such gasoline being metered. When sufficient air has accumulated in the air separator, it is released through a valve-controlled passage, back into the discharge line on the output side of the meter. Such valve-controlled passage, not only by-passes the removed air around the meter, but serves the added and highly desirable function of breaking the siphoning action through the meter, in a gravity system, to prevent the meter from being siphoned dry when the tank has become emptied.

In conventional gravity discharge systems, however, following emptying of a tank and breaking of the siphoning action through the meter, as indicated previously, liquid draining from the tank and pipes will continue to discharge as a light flow or dribble, and cause continued operation of the meter in accordance with the momentum of such liquid, until the flow of liquid diminishes to the point of being incapable of further rotating the meter.

Meters will register accurately down to a certain minimum rate of flow, below which, the meter becomes progressively more inaccurate as the flow of liquid thereto diminishes. Thus, if a meter registers accurately down to a lower limit of flow, say of the order of 10 gallons per minute, its accuracy will diminish for values of flow below such minimum. Such lower limit will be termed the minimum capacity of the meter, and must therefore be taken into consideration, to assure accuracy of metering at all times, for under the circumstances noted, the meter is likely to continue functioning for a brief period after the flow has dropped below the minimum capacity of the meter to register accurately.

Among the objects of the present invention are:

(1) To provide a novel and improved means for precluding inaccurate metering of liquid, due to drain flow below the minimum capacity of the meter to measure accurately, such drain flow occurring upon the emptying of a tank from which such liquid is being dispensed;

(2) To provide a novel and improved means for preventing drain flow through the meter in a liquid dispensing system, following emptying of a tank from which the liquid is being dispensed;

(3) To provide a novel and improved means for preventing drain flow through the meter in a liquid dispensing system, following emptying of a tank from which the liquid is being dispensed, which means shall be adjustable to the operating conditions in any particular system installation;

(4) To provide a novel and improved air separator for use in a liquid dispensing system of the gravity type, capable of precluding drain flow through the meter in such system, following emptying of a tank from which the liquid is being dispensed.

Additional objects of my invention will be brought out in the following description of a preferred embodiment of the same, taken in conjunction with the accompanying drawings wherein—

Figure 1 is a front elevational view partly in section through an installation embodying the features of the present invention;

Figure 2 is a side elevational view of the installation of Figure 1;

Figure 3:
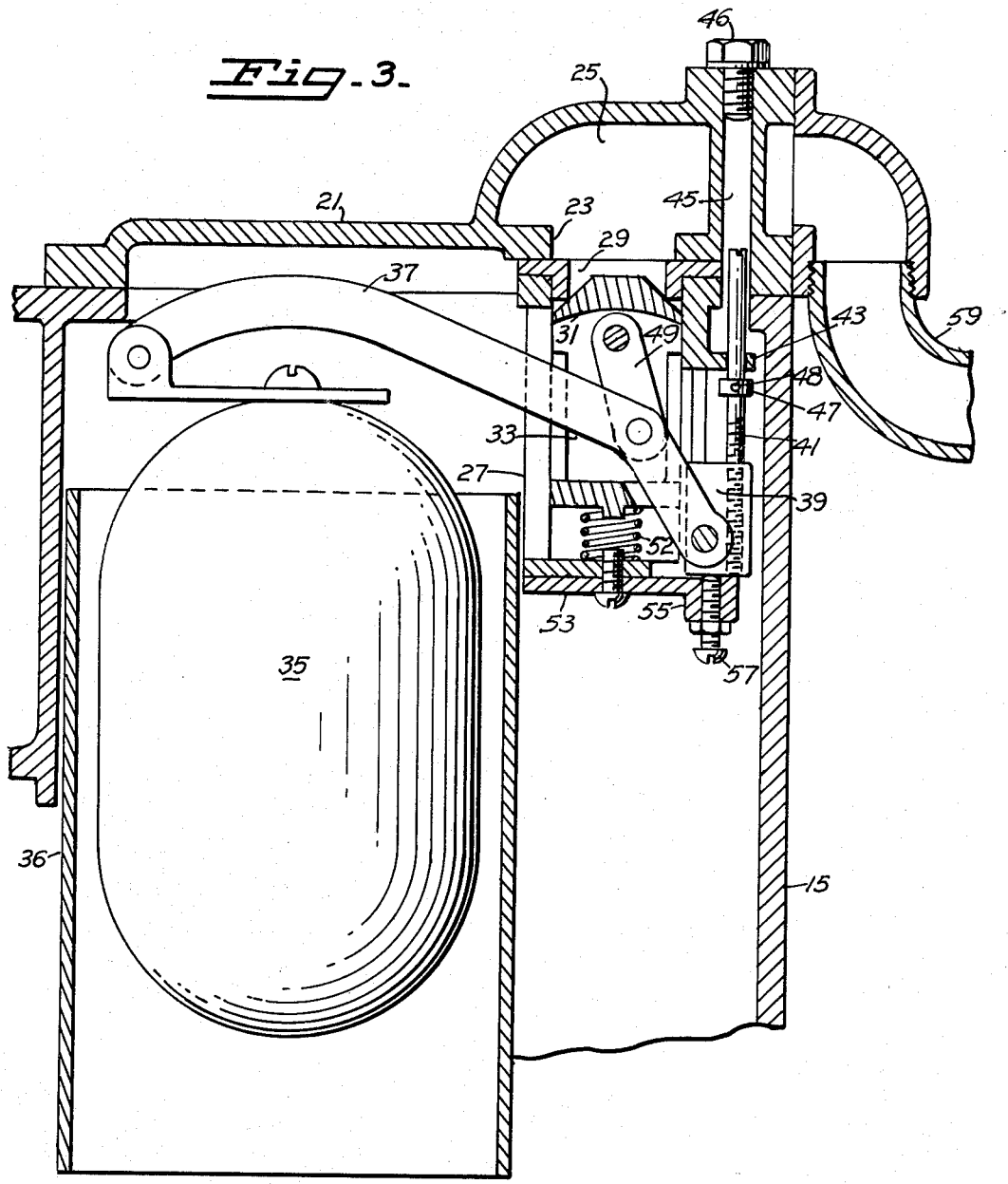
Figure 3 is an enlarged view in section depicting the details of one embodiment of the invention.
Figure 4:
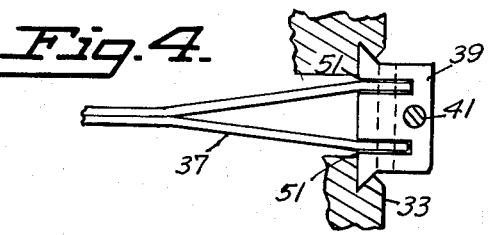
Figure 4 is a view illustrating a detail of construction of the embodiment of Figure 3.

One way of accomplishing the broad purpose of the present invention of accurately measuring the liquid flow in the discharge line of a gravity system at all times, is to bring the meter to a definite stop just prior to the moment when the flow of liquid to the meter dwindles down to a value below the minimum capacity of the meter to measure accurately.

For details of my invention, reference will be had to the aforementioned drawings, depicting the invention as embodied in a gravity system involving a tank 1, a discharge line 3 including the discharge hose 5, leading from said tank. Connected in the line is a meter 7, preferably one of the positive displacement type. Such meter has an input opening 9, and a discharge opening 11 at a higher level, at which point the hose 5 is connected.

In the dispensing of liquid from the tank by gravity, it will flow through the meter where it is measured. Until the tank "empties," the flow will satisfy at least the minimum requirements for accuracy of metering to be realized. However, when the flow dwindles to a value where it can no longer satisfy the minimum capacity of the meter to measure accurately, accuracy will no longer be realizable under such conditions.

Adjacent the meter, on the tank side, I accordingly insert in the line a conventional type air separator 13 which has been modified to accomplish the objects of the present invention, in that it will function automatically, when properly adjusted, to preclude further flow of liquid through the meter following emptying of a tank and the dwindling of flow through the meter to a value below the minimum capacity of such meter to measure accurately.

Such device may consist of an open-top casing 15 partitioned off to provide a strainer chamber 17, and a float chamber 19 having a floor below the level of the discharge opening 11 of the meter.

At its upper end, the float chamber is closed by a cap or cover 21 having an opening 23 therein providing communication between the float chamber and an air discharge passage 25 formed integrally with the cap.

Suspended from the cap about the opening is a valve cage 27 and included valve seat insert 29, which also defines the passage through this valve.

Slidably mounted in the cage is a frusto-conical valve 31 adapted to seat with its conical surface, and having a vertically slotted stem 33 adapted at its lower end to slidably fit within the cage, to stabilize movements of the valve therein.

Operational movements of the valve are controlled by a float 35 protected against turbulence by a surrounding cylinder 36. The float is suspended in the float chamber at the end of a lever 37, which passes through the valve cage and slotted valve stem, and is pivotally anchored in block 39. Such block is slidably disposed by tongue and groove means, in the wall of the valve cage for limited permissible vertical movement therein, as determined by an adjusting screw 41 which is adjustably threaded into the block and extends upwardly through an offset guide 43 on the valve cage, and into a vertical passage 45 through the cover. This renders the adjusting screw accessible from above for adjusting purposes. A cap screw 46 closes the exposed end of the passage to preclude unauthorized tampering with the adjusting screw.

A collar 47 on the screw, below the guide, determines, by its spacing from the guide, the extent of permissible movement of the anchoring block. This collar is slidably mounted on the screw and its position thereon is adjustably fixed by a set screw 48 in the collar.

To an intermediate point on said lever, the valve is connected by a link 49, whereby float movements will be converted into movements of the valve. To obtain stability at this point, the tail end of the lever is preferably bifurcated and pivotally anchored in spaced slots 51 formed in the block, while the link 49 is pin mounted to the lever, between the spaced portions of the bifurcated end. The necessary range of swing of the float lever is assured by removing that lower edge portion of both the valve cage and valve stem which might otherwise interfere with such lever movement.

A coil spring 52 disposed between the valve stem 33 and the bottom of the valve cage serves to cushion operations of the valve.

A flat bar 53 is affixed to the underside of the valve cage, such bar terminating beneath the anchoring block 39 in a boss 55 having a threaded passage therethrough to receive an adjusting screw 57. This provides a support for the anchor block and by manipulating this screw, the valve may be caused to seat securely against the valve seat when the float is riding high and closure of the valve is desired.

Under normal conditions of operation in a gravity system, the device will function in the manner of a conventional air separator. As air separates out from the liquid in the float chamber and accumulates in the upper regions thereof, such accumulation as it increases, will gradually depress the liquid level and with it, the float, until the valve is opened and releases the accumulation of air therein.

A pipe connection 59 from the air discharge passage to the output side of the meter, serves to by-pass the meter and introduce this air back into the line to discharge with the liquid.

Concurrent with such release of accumulated air, the level of liquid in the float chamber will rise to a point where the float will again close the valve and initiate another air removal cycle. During these cycles, however, and so long as the supply tank contains sufficient liquid, the flow to the meter will be adequate to satisfy the minimum capacity of the meter, and consequently metering of the liquid will continue to be accurate. Insofar as the air separation function is concerned, the lowering of the liquid level and consequently the lowering of the float is attributable solely to the accumulation of air in the upper regions of the device, and consequently the adjustment of the anchor block is of little moment in this connection.

However, when the tank empties, the lowering of the liquid level in the float chamber will be due to a reduction in the flow from the tank, and not to any accumulation of air in the upper region of the float chamber. It is at this stage in the operation of the system that the flow to the meter drops below the minimum capacity of the meter to measure accurately, and inaccuracies in metering can and do occur.

The mere breaking of the siphoning action through the meter by opening the valve in the float chamber, which automatically occurs in the conventional air separator, due to the dropping liquid level in the float chamber, is not in and of itself sufficient to accomplish the objectives of the present invention, for the inertia of the liquid still flowing from the tank and lines is ofttimes sufficient to operate the meter, though the flow to the meter in terms of gallons per minute might be below its minimum capacity to measure accurately.

It becomes vital, therefore, in the elimination of such inaccuracies, that the siphoning action be broken at some particular point in the drain flow period, such that the meter will come to a dead stop when the flow thereto has dwindled to a value below its minimum capacity.

Inasmuch as installations of the type under consideration, vary both as to tank elevation and piping arrangement, the drain flow characteristics will necessarily vary from one installation to another, and no predetermined point of siphon breaking can be arrived at which will satisfy all conditions. Consequently, it becomes necessary to determine the siphon breaking point for each installation. The structure described above, makes this possible.

In determining this somewhat critical point at which to break the siphon action through the meter, the hose is arranged to discharge into a container of certified volume or capacity. The valve assembly is adjusted to open the valve at some arbitrary liquid level. Liquid is then discharged through the meter and into this container from a tank of less capacity than the container, so that the tank will empty and expose the meter to a drain flow. After the meter has come to a dead stop, a fresh tank of liquid, in amount sufficient to supply the balance necessary to fill the container to its certified capacity, is then connected in the system, and discharged through the meter until the container is filled, at which instant, the flow is shut off.

If, upon checking the meter reading, it is found that the meter reads more than the certified quantity which has passed through it, as measured by the container, then the discrepancy may be attributed to drain flow through the meter during the draining period of the first tank. This would indicate, then, a requirement for a longer delay in the breaking of the siphon action, such that, what further drain flow takes place, will merely accumulate in the float chamber and meter, and not reach a level above the discharge opening of the meter.

Holding up the breaking of the siphoning action too long, may result in reaching a level in the float chamber, such as to uncover the intake opening to the meter and admit air thereto, and thereby cause erratic readings.

To avoid such occurrence in determining the proper moment for breaking the siphoning action, one approach would be to start with an adjustment of the valve mechanism such as to cause opening of the valve at a reasonably high level and work down to the proper level. Once an adjustment has been made, it need not be changed thereafter, unless the flow characteristics of the particular system have, for some reason or other, been altered.

While I have described my invention in substantial detail, it will be apparent that the same is subject to alteration and modification without departing from the underlying principles involved, and I accordingly do not desire to be limited in my protection, except as may be necessitated by the appended claims.

I claim:

1. An air separator and siphon breaker comprising a casing, air valve means including a valve in the upper portion of said casing, float controlled means coupled to said air valve means for opening said valve when the level of liquid in said chamber drops to a predetermined point, said float controlled means including a lever, a lever anchor block, means pivotally anchoring said lever at one end to said anchor block, means slidably supporting said anchor block in said casing, said means having a lower position of rest for said anchor block, a float supported from the other end of said lever, means connecting said valve to an intermediate point on said lever, and means for adjusting said position of rest of said anchor block to secure effective closing of said valve with said float riding high in said casing.

2. An air separator and siphon breaker comprising a casing, air valve means including a valve in the upper portion of said casing, float controlled means coupled to said air valve means for opening said valve when the level of liquid in said chamber drops to a predetermined point, said float controlled means including a lever, a lever anchor block, means pivotally anchoring said lever at one end to said anchor block, means slidably supporting said anchor block in said casing, said means having a lower position of rest for said anchor block, a float supported from the other end of said lever, means connecting said valve to an intermediate point on said lever, and means for altering the permissive range of movement of said anchor block from said position of rest to adjust the level at which said valve will open.

3. An air separator and siphon breaker comprising a casing, air valve means including a valve in the upper portion of said casing, float controlled means coupled to said air valve means for opening said valve when the level of liquid in said chamber drops to a predetermined point, said float controlled means including a lever, a lever anchor block, means pivotally anchoring said lever at one end to said anchor block, means slidably supporting said anchor block in said casing, said means having a lower position of rest for said anchor block, a float supported from the other end of said lever, means connecting said valve to an intermediate point on said lever, means for adjusting said position of rest of said anchor block to secure effective closing of said valve with said float riding high in said casing, and means for altering the permissive range of movement of said anchor block from said position of rest to adjust the level at which said valve will open.

4. An air separator and siphon breaker comprising a casing, air valve means including a valve in the upper portion of said casing, float controlled means coupled to said air valve means for opening said valve when the level of liquid in said chamber drops to a predetermined point, said float controlled means including a lever, a lever anchor block, means pivotally anchoring said lever at one end to said anchor block, means slidably supporting said anchor block in said casing, said means having a lower position of rest for said anchor block, a float supported from the other end of said lever, means connecting said valve to an intermediate point on said lever, and means for altering the permissive range of movement of said anchor block from said position of rest to adjust the level at which said valve will open, said means including a guide in said casing, said guide having a guide opening therethrough in line with said anchor block, an adjusting screw passing through said guide and threadedly connecting with said anchor block, a stop on said screw at a point intermediate said guide and said anchor block, and means providing access to said screw through the top of said casing.

5. An air separator and siphon breaker comprising a casing, air valve means including a valve in the upper portion of said casing, float controlled means coupled to said air valve means for opening said valve when the level of liquid in said chamber drops to a predetermined point, said float controlled means including a lever, a level anchor block, means pivotally anchoring said lever at one end to said anchor block, means slidably supporting said anchor block in said casing, said means having a lower position of rest for said anchor block, a float supported from the other end of said lever, means connecting said valve to an intermediate point on said lever, means for adjusting said position of rest of said anchor block to secure effective closing of said valve with said float riding high in said casing, and means for altering the permissive range of movement of said anchor block from said position of rest to adjust the level at which said valve will open, said means including a guide in said casing, said guide having a guide opening therethrough in line with said anchor block, an adjusting screw passing through said guide and threadedly connecting with said anchor block, a stop on said screw at a point intermediate said guide and said anchor block, means for adjusting the position of said stop on said screw, and means providing access to said screw through the top of said casing.

References Cited in the file of this patent

UNITED STATES PATENTS

| | | |
|---|---|---|
| 2,018,901 | Rush | Oct. 29, 1935 |
| 2,093,952 | Brubaker | Sept. 21, 1937 |
| 2,186,069 | Hazard | Jan. 9, 1940 |
| 2,592,685 | Grise | Apr. 15, 1952 |